(12) United States Patent
Konop

(10) Patent No.: US 6,247,713 B1
(45) Date of Patent: Jun. 19, 2001

(54) AXLE ATTACHMENT ARRANGEMENT FOR TAG AXLE

(75) Inventor: Chad O. Konop, Appleton, WI (US)

(73) Assignee: McNeilus Truck and Manufacturing, Inc., Dodge Center, MN (US)

(*) Notice: Subject to any disclaimer, the term of this patent is extended or adjusted under 35 U.S.C. 154(b) by 0 days.

(21) Appl. No.: 09/510,977

(22) Filed: Feb. 21, 2000

(51) Int. Cl.[7] .................................................. B62D 61/12
(52) U.S. Cl. ........................................ 280/86.5; 180/209
(58) Field of Search .............................. 280/86.5, 80.1; 180/209, 905, 906; 301/125, 130

(56) References Cited

U.S. PATENT DOCUMENTS

| | | |
|---|---|---|
| 4,061,361 | 12/1977 | Felburn . |
| 4,199,262 | 4/1980 | Cribb et al. . |
| 4,314,709 | 2/1982 | Silbernagel . |
| 4,501,437 | 2/1985 | Becker . |
| 5,018,593 | * 5/1991 | Hermann ........................... 180/24.02 |
| 5,018,755 | 5/1991 | McNeilus et al. . |
| 5,597,174 | * 1/1997 | Christenson et al. ................. 280/704 |
| 5,868,078 | 2/1999 | Madison . |
| 5,897,123 | 4/1999 | Cherney et al. . |
| 6,135,469 | * 10/2000 | Hulstein et al. ..................... 280/86.5 |

* cited by examiner

*Primary Examiner*—Paul N. Dickson
*Assistant Examiner*—Faye M. Fleming
(74) *Attorney, Agent, or Firm*—Nikolai, Mersereau & Dietz, P.A.

(57) ABSTRACT

A swing-frame auxiliary axle system for a work vehicle and method of assembling is disclosed that includes a pivot frame having a pair of spaced pivot arms having a pivot end and a free end and being connected to carry a common transverse torque tube close to the free end thereof, each arm being pivotally mounted to a vehicle chassis rail near the pivot end, the torque tube including a pair of tag axles attached thereto and wheels. The system is provided with a pivot frame alignment system for intrinsically aligning the pivot spaced arms and the torque tube in proper transverse relation for ease in assembling or re-assembling and stability in operating.

11 Claims, 5 Drawing Sheets

AXLE ATTACHMENT ARRANGEMENT FOR TAG AXLE

BACKGROUND OF THE INVENTION

I. Field of the Invention

The present invention relates generally to swing-frame auxiliary axle systems for load-hauling vehicles and, more particularly, to an axle-attaching swing frame that includes a self-aligning system for attaching and re-attaching the free ends of the swing frame arms of a stowable tag axle to the tag axle carrying torque tube that automatically produces repeatable, accurate alignment between the torque tube and the swing arms.

II. Related Art

Optionally deployable, swing-frame auxiliary axle systems are well known and have long been associated with a variety of types of load-hauling vehicles, particularly those accustomed to relatively heavy time-varying loading, such as dump trucks, refuse collection vehicles and transit concrete mixers. The trucks typically include a chassis or frame, a cab and a dedicated truck body mounted on the chassis behind the cab. They also include a forward steering axle placed near the front of the cab and one or more sets of drive axles spaced behind the steering axle, the drive axles often being provided in a dual axle arrangement. The auxiliary axle systems furnish additional load carrying capacity by providing an additional axle to assist the steering and drive axles in supporting the load and in adjusting the inter-axle distance or increasing the overall front-to-rear axle span distance for the vehicle. In this manner, not only does the tag axle system assist in balancing the load carried by, for example, a transit mixing cement truck, but generally it also enables the truck to carry a higher legal total payload than would otherwise be permitted because weight restrictions placed on vehicles traveling over highways are typically measured in terms of load per axle in combination with overall spacing between the vehicle axles.

Examples of such auxiliary axle assemblies that can be selectively engaged with the ground are shown, for example, in U.S. Pat. Nos. 5,897,123 and 5,018,755. Thus, it is known to have tag axle systems generally consisting of a rear tubular cross member or torque tube carrying spaced wheel assemblies, the torque tube being fixed in transverse relation to and carried by and at the end of a pair of spaced tag axle arms which, in turn, are pivotally mounted to the rear portion of a truck chassis according to a generally known arrangement. Linear reciprocating operating devices, typically hydraulic cylinders, or pneumatic devices are employed to pivot the tag axle system between a raised or stowed position and a lowered or ground-engaging position. The force applied by the tag axle system in support of the load may be varied by controlling the applied pressure.

The pivotal swing frames of the class mount in some fashion from the main longitudinal chassis frame or rail members possibly using a pair of flange members each of which carry a pivot pin member journaled in a bushing or bearings carried in an integral housing with one pin member carrying each of the pivot arms. Such a system which can accurately be removed and replaced from the spaced longitudinal chassis frame or rail members is illustrated and described in co-pending application Ser. No. 09/507,608, filed of even date, entitled "SWING-FRAME ASSEMBLY FOR TAG AXLE", and assigned to the same assignee as the present invention.

Because of the generally high wear nature of the environmental and other circumstances of use for tag axle systems of the class, frequent repairs may be necessary and such may require the dis-assembly or partial dis-assembly of the unit. For this and other reasons, ease of separation and re-assembly of principle parts is a prime concern to users.

One important consideration involves the assembly and re-assembly of the swing frame to the tag torque tube. They must be related in a manner that assures accurate alignment of the torque tube with the permanent wheel axles of the vehicle which is essential for true tacking of the tag wheels. In the past, this has been an involved process requiring the use of large alignment jigs to assure proper placement of the swing arms relative to the torque tube every time the assembly is put together. This is quite time-consuming. U-bolts, or the like, have typically been used to connect the ends of the swing arms to the torque tube. The U-bolts tend to loosen over time and cause misalignment of the system. Thus, these mounts have been found to be difficult to assemble and maintain in proper alignment.

Thus, there remains a definite need for a system and technique to assemble the pivot arms to the torque tube which results in an accurate repeatable alignment of the torque tube with the pivot arms. The system should work as well for subsequent re-assembly as for the original factory assembly.

Accordingly, it is a primary object of the present invention to provide a system and method that results in labor-saving, accurate, repeatable alignment of the torque tube as it is connected to the pivot arms of a pivot frame tag axle assembly.

It is another object of the present invention to provide a system of sub-assemblies which, when assembled together, result in accurate alignment of the torque tube and pivot arms of a pivot frame tag axle assembly without the need for jigs to align the parts when combining the sub-assemblies.

Still another object of the present invention is to provide such a system that will maintain accurate alignment during use.

Further object, advantages and novel features of the present invention will become apparent from the detailed description of the invention, taken in conjunction with the accompanying claims and drawings.

SUMMARY OF THE INVENTION

The present invention solves several long-standing problems associated with the construction and maintenance of swing-frame pivot assemblies for tag axle systems. By means of the present invention, there is provided a pivot frame tag axle assembly in which aligned sub-assemblies predict repeatable accurate alignment between torque tube and swing arm frame which, in turn, is essential for true tag wheel tracking. The invention combines a unique method of mounting free ends of the swing arms of the swing frame to the torque tube carrying and connecting the stub axle assemblies for the tag axle system.

The detailed embodiment illustrates one form of the invention in which the torque tube for the tag axle system is provided with a pair of spaced shaped saddle devices formed of heavy gauge metal, each of which has a lower assembly shaped to be congruent with the outer surface of the torque tube and carrying a substantially flat top saddle portion which attaches to the lower assembly and which is provided with a pair of spaced mounting bolt holes which are aligned perpendicular to the axis of the torque tube when the saddle is mounted on the torque tube. The saddles are welded to the torque tube to provide an accurate, permanent sub-assembly. The saddles are spaced toward the end of the torque tube and are aligned on the torque tube so that the top portions are substantially co-planar.

The free end portions of the pivot arms of the swing-frame assembly are constructed using a pair of spaced flange members including an upper and lower flange member, the ends of which are substantially parallel and separated and spaced by a pair of spaced web members creating in effect a hollow beam structure. Each of the flange members is provided with a pair of in-line slots along and between the web members which align with the corresponding slots in the other of the pair of flange members as the flange members are aligned. The lower flange member is further provided with a rigid bottom mounting plate member which includes a series of in-line spaced bolt holes, the bottom plate member is properly aligned, preferably using a jig so that the bottom plate will correctly align both with the arm and with the corresponding torque tube saddle when assembled. Each bottom mounting plate is fixed as by welding to the lower flange of the free end of the pivot arm.

In assembling the system, the pair of spaced mounting bolt holes in each torque tube saddle is aligned with a corresponding pair of bolt holes in the bottom mounting plate and the free end of each arm bolted to a saddle using a pair of bolts and hex nuts, locking fasteners such as Huck nuts, or the like. Use of a slotted construction in the pivot arm flanges facilitates alignment of the parts to facilitate threading the fastening bolts through the system. It will also be apparent that once assembled in place, the main shafts of the bolts are hidden within the hollow defined by the pair of web membranes and the spaced flanges. A cover plate with aligned bolt holes spaced as in the saddles is placed over the top slots prior to the application of hex nuts or Huck fasteners to receive the bolts and prevent debris from entering the slots.

It will be appreciated that the assembled tag axle pivot frame will assemble so that the torque tube will be in proper transverse alignment with the free ends of the pivot arms and will remain so no matter how many times the torque tube and pivot arm sub-assemblies are separated and re-assembled.

BRIEF DESCRIPTION OF THE DRAWINGS

In the drawings, wherein like numerals are utilized to designate like parts throughout the same.

DETAILED DESCRIPTION

In accordance with the detailed description of the present invention, the particular embodiments illustrated and described are meant to present examples of the invention and not be limiting with respect to the invention in any manner as it is believed that other structures may occur to those skilled in the art which remain well within the confines of the inventive concepts. It will be appreciated that the present invention not only provides a tag axle pivot frame and torque tube combination that is easier to assemble, it also provides a more stable and rugged design for the tag axle system.

Figure 1:
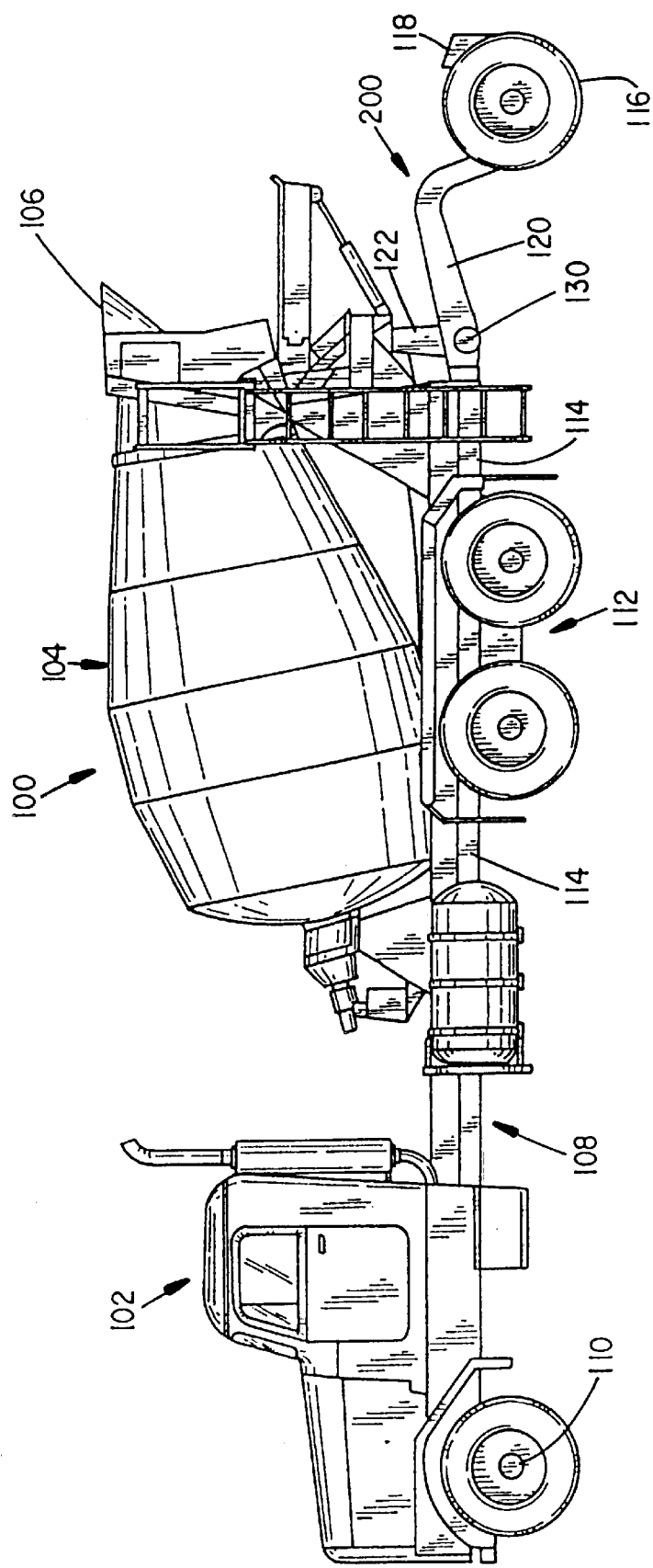
FIG. 1 is a side view of a transit concrete mixing work vehicle having a swing-frame auxiliary axle of a class suitable for use with the axle attachment system of the present invention shown in a deployed position.

FIG. 1 depicts a transit concrete mixing truck 100 having a cab 102 and a mixing drum 104 mounted behind the cab for receiving materials through a hopper 106. The mixing drum mixes concrete internally and dispenses it through the rear of the drum 104 in a well known manner. The vehicle further includes a chassis 108 on which the drum and the cab are mounted and which is further provided with a steering axle 110 and a dual axle drive wheel arrangement at 112. The vehicle chassis further includes a pair of spaced parallel main chassis members or frame rails, one of which is shown at 114, and which extend along the length of the vehicle 100 and from which an auxiliary axle, generally 200, is pivotally mounted. The tag axle includes a pair of tag wheels as at 116 and a fender depicted at 118. One swing-frame arm or pivot arm associated with the pivot frame of the auxiliary axle assembly is shown at 120 and a tag pivot arm at 122.

Figure 2:
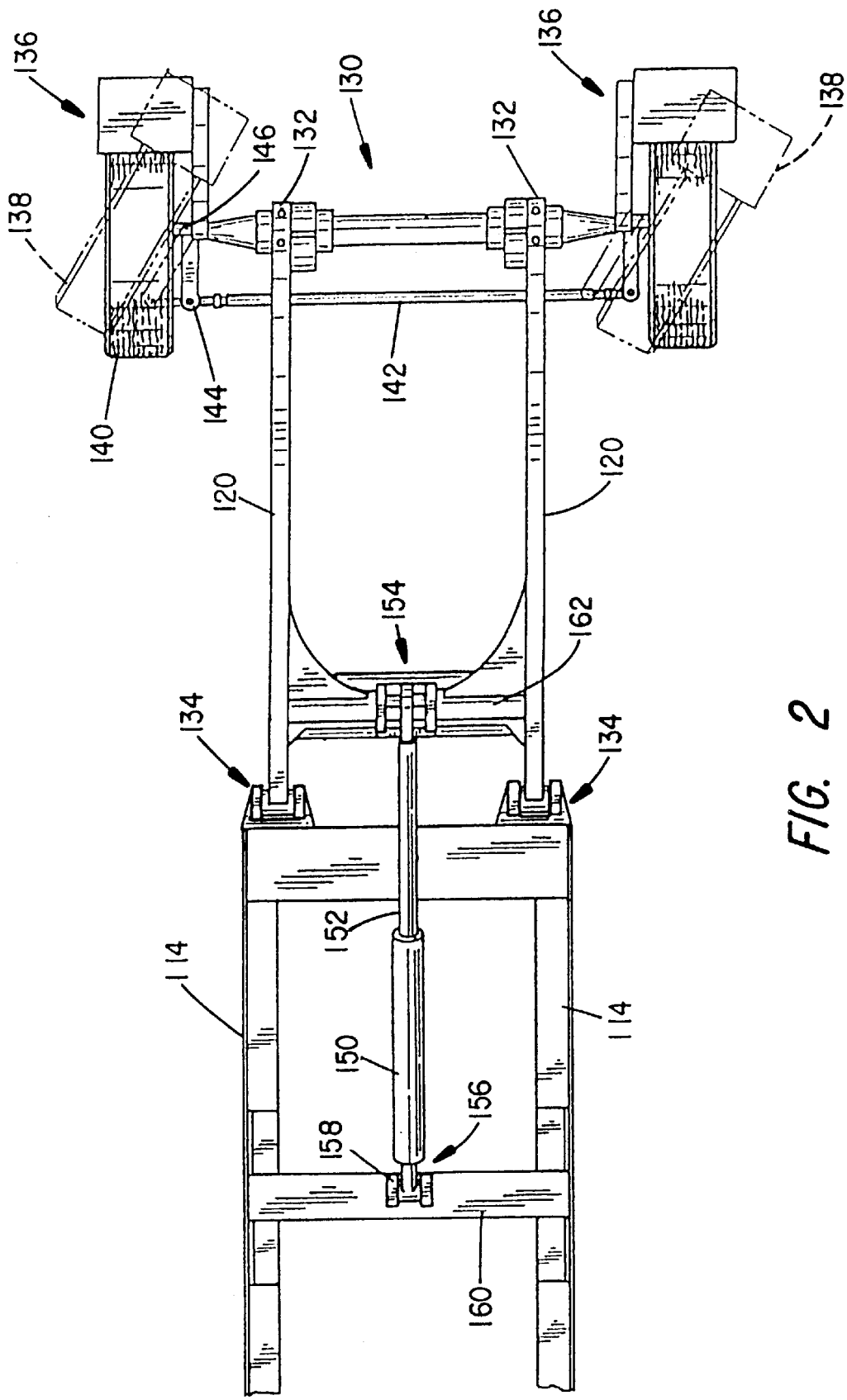
FIG. 2 is a top view of the auxiliary axle assembly of FIG. 1.

FIG. 2 depicts a general structure of the auxiliary axle assembly 200, including the spaced parallel pivot arms 120 which connect with torque tube 130 which spans the free ends 132 of the pivot arms 120. The other ends of the pivot arms 120 are pivotally mounted to the chassis members 114 by pivot assemblies, generally at 134. Examples of these mountings are shown and described in greater detail with respect to the above-cross referenced specification which is hereby incorporated herein by reference. The mounting of the arm to the truck chassis does not form a part of the present invention, although it is assumed that accurate aligned mounts are provided, examples of which appear in the above-incorporated specification. The ends of the torque tube 130 further each carry a tag wheel assembly, generally 136, shown in an alternate steerable position by the phantom lines 138. Wheels 140 are interconnected by a connecting rod 142 through links 144 connected to a wheel pivot 146 and causes the wheels to pivot or steer in unison. The assembly further includes an operating cylinder 150 with rod 152 connected between the block of a bearing or bushing assembly pivot joint generally at 154. The blind end of the cylinder 150 is also pivotally mounted as at 156 by a pin and bearing system connected between blocks 158 on a transverse member 160 in a conventional manner.

Thus, the attachment system for the swing frame includes spaced sub-systems that address each of the chassis rails 114 and includes attachment members connected to the pivot arms 120 and a common connector as at 162. Each attachment sub-system associated with one of the pivot arms of the swing frame cooperates with the operation of the cylinder and rod 150 and 152 to raise, lower and provide load support pressure in the tag axle system in a well known manner.

Figure 3:
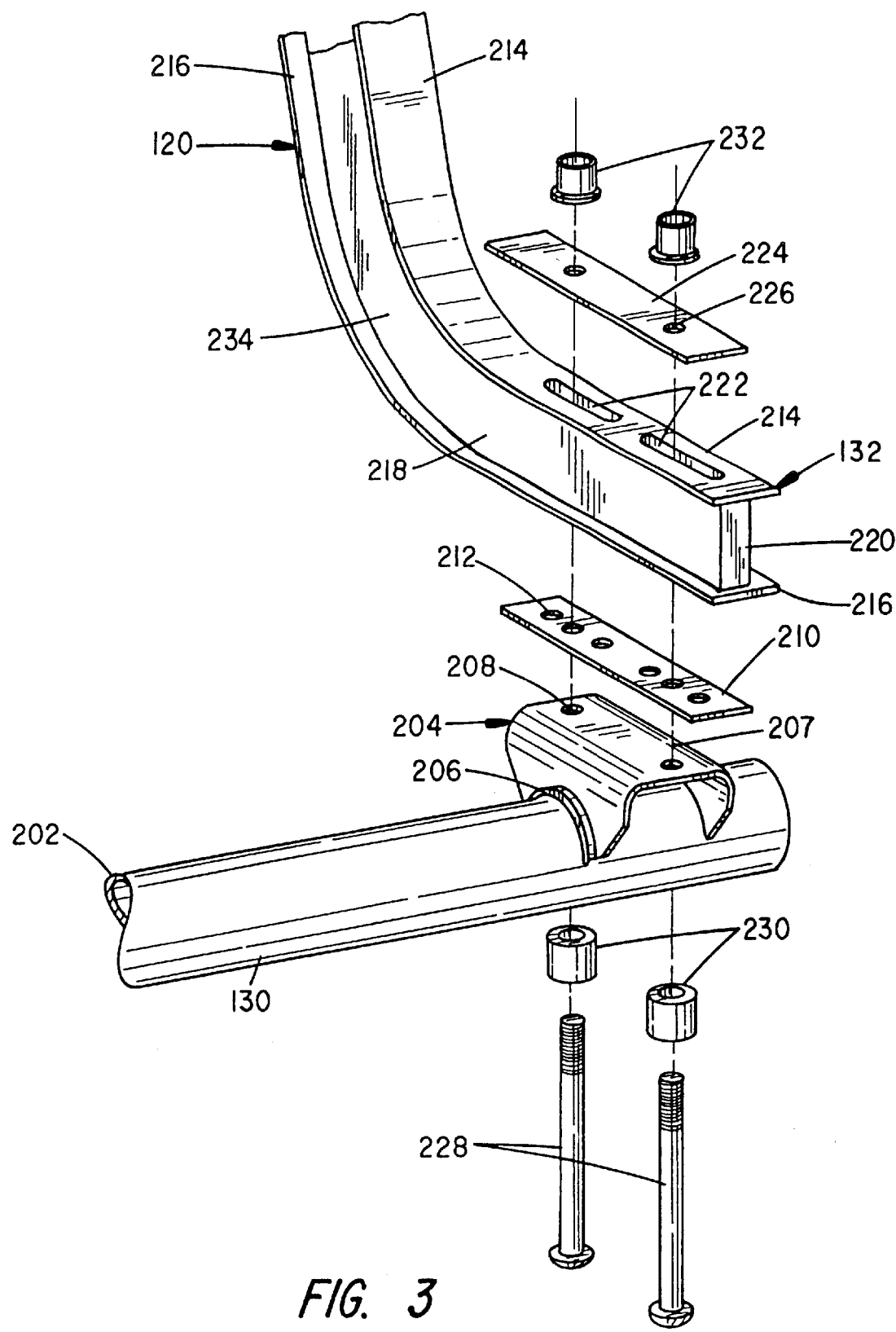
FIG. 3 is an enlarged fragmentary exploded view showing the assembly of one pivot arm to a torque tube in accordance with the invention.
Figure 4:
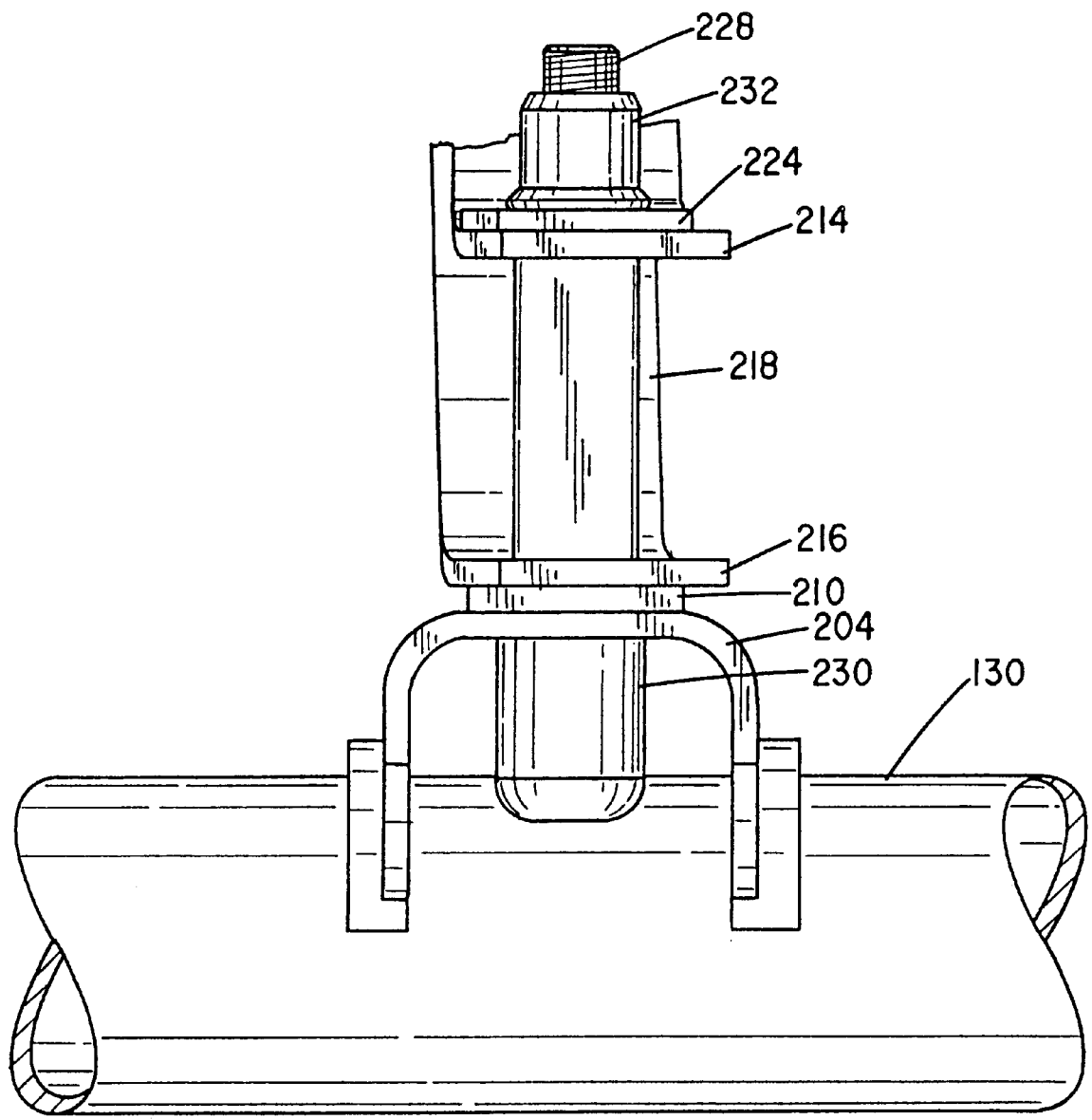
FIG. 4 is an enlarged front view with parts cut away showing the parts of FIG. 3 in the assembled state.
Figure 5:
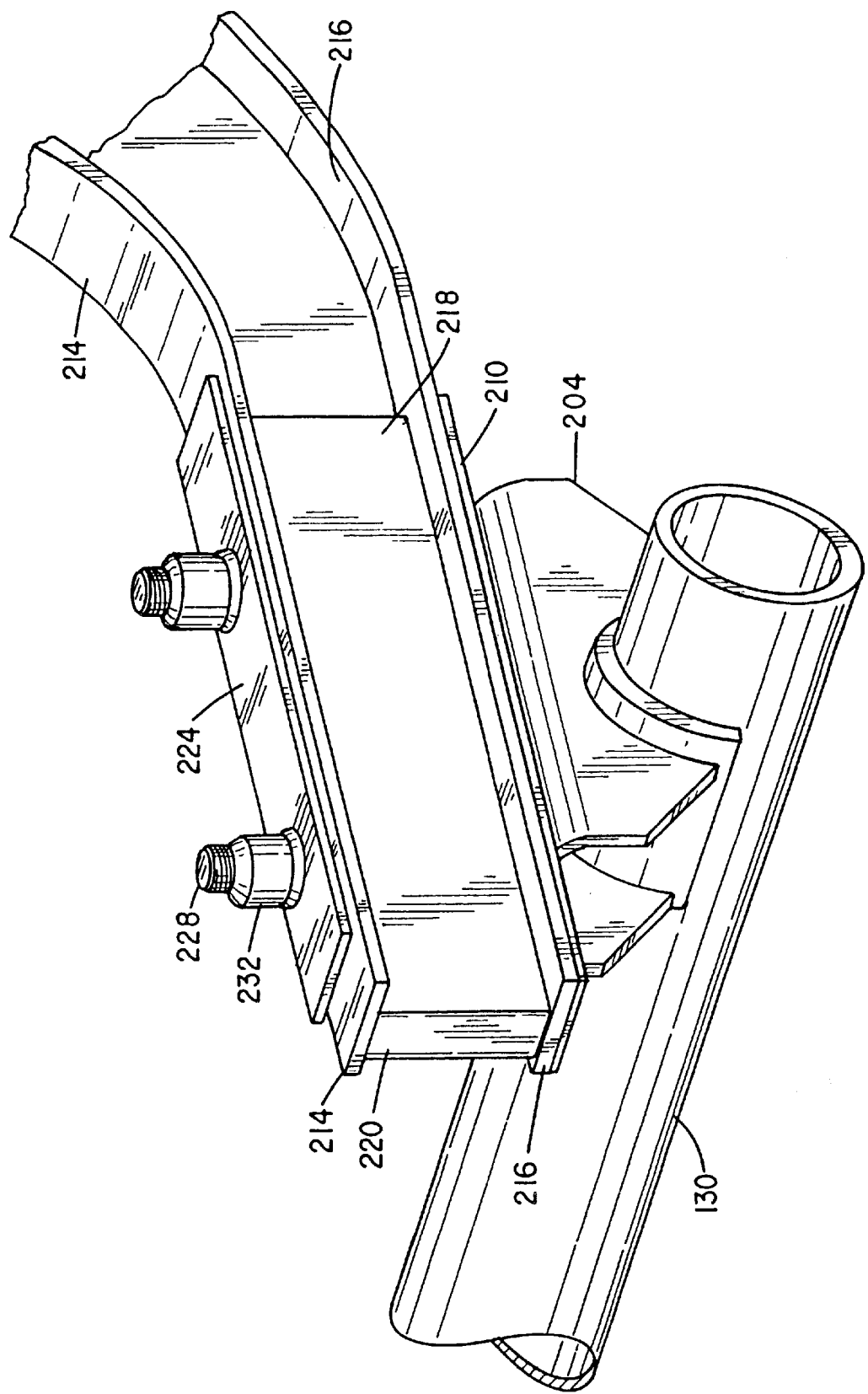
FIG. 5 is a perspective view showing the pivot arm assembled on the torque tube in accordance with FIG. 4.

FIG. 3 is a greatly enlarged exploded fragmentary view showing the parts for assembling the ends 132 of the pivot arms 120 to the torque tube 130. It should be noted that although FIGS. 3–5 show the attachment of but one pivot arm 120 to the torque tube 130, it is understood that spaced from the assembly shown is another identical assembly for attaching the other pivot arm 120 toward the other end of the torque tube 130, shown broken at 202.

The assembly includes an attachment saddle 204 including a lower member 206 conforming to the torque tube 130 that is welded to the torque tube 130, the upper section 207 containing a pair of spaced aligned bolt holes as at 208. A bottom mounting plate member 210 is provided and has a series of aligned bolt holes as at 212. As better seen at FIGS. 4 and 5, the pivot arm member 120 further includes a pair of spaced flange members including an upper flange member 214 and a lower flange member 216 spaced at the end section thereof by a pair of spaced web members, one of which is shown at 218 and which are closed by an end member 220 (FIG. 5). The flange members 214 and 216 contain a pair of aligned slots, two of which are shown at 222 in FIG. 3. The sealing top plate is shown at 224 with bolt holes 226. The system is fastened together using a pair of bolts 228 with spacers 230 which extend through the openings with the bolt holes 208, 212, 222 and 226 to a pair of locking or Huck fittings as shown as 232. The system is shown assembled in FIGS. 4 and 5. A single web 234 may be used for the remainder or upper section of the spaced pivot arms 120.

The bottom mounting plate 210, having the spaced openings 212, is carefully aligned with and welded to the bottom flange 216 of the pivot arm 120. The mounting plate must properly align the pivot arm with the corresponding saddle. The pair of spaced mounting holes 208 in each saddle can then be aligned with a corresponding pair of bolt holes in the bottom mounting plate 210 and the free end of the arm bolted to the saddle using the bolts 228, spacers 230 and Huck fittings or hex nuts as desired to 232. The use of slotted construction in the top flanges 214 and 216, of course, facilitates alignment of the parts for threading through the fastening bolts 228. The plate 224 can be placed over slots 222 and the bolts 228 to protect the internal hollow webbing area from collecting debris or the like, thereby sealing the internal portion of the multi-web section.

It will be appreciated that the saddles 204 with flanges 206 are carefully aligned with respect to the torque tube 130 during the initial construction and thereafter remain fixed in aligned position with respect to the torque tube 130. This is also the case with respect to fixing the plate 210 with respect to the bottom flange 216 of the pivot arms 120 so that assembly of the pivot arms 120 to the saddles 204 aligns the cross torque tube 130 with respect to both arms accurately no matter how many times the system is taken apart and re-assembled.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A swing-frame auxiliary axle system for a work vehicle having a main frame including spaced chassis rails comprising:

(a) an auxiliary axle assembly which includes a pivot frame having a pair of spaced pivot arms having a pivot end and a free end and being connected by a cross member toward the pivot end and connected to carry a common transverse torque tube close to the free end thereof, each said pivot end being pivotally mounted to a vehicle, said torque tube carrying a pair of tag axles attached thereto and wheels;

(b) an operating system for moving the auxiliary axle assembly between a stowed position in which the wheels are elevated and a support position in which the wheels engage the ground;

(c) wherein said pivot frame further includes a pivot frame alignment system for inherently aligning said spaced pivot arms and said torque tube in proper transverse relation; and (d) removable fastening devices for fastening said torque tube to said pivot arms.

2. A swing-frame auxiliary axle system for a work vehicle having a main frame including spaced chassis rails comprising:

(a) an auxiliary axle assembly which includes a pivot frame having a pair of spaced pivot arms having a pivot end and a free end and being connected by a cross member toward the pivot end and connected to carry a common transverse torque tube close to the free end thereof, each said pivot end being pivotally mounted to a vehicle, said torque tube carrying a pair of tag axles attached thereto and wheels;

(b) an operating system for moving the auxiliary axle assembly between a stowed position in which the wheels are elevated and a support position in which the wheels engage the ground;

(c) wherein said pivot frame further includes a pivot frame alignment system for inherently aligning said spaced pivot arms and said torque tube in proper transverse relation;

(d) wherein said pivot frame alignment system further comprises pivot arm mounting devices fixed to the free ends of said pivot arms and providing aligned arm mounting holes, torque tube mounting devices fixed to said torque tube and including aligned tube mounting holes such that alignment of said tube mounting holes with said arm mounting holes aligns said torque tube in the desired transverse relation to said pivot arms; and (e) removable fastening devices for fastening said torque tube to said pivot arms.

3. The apparatus of claim 2 wherein said fastening devices are bolts and locking fasteners.

4. The apparatus of claim 2 wherein said pivot arm mounting devices further comprise plate members containing serially aligned bolt holes and wherein said torque tube mounting devices further include aligned transverse saddles fixed to said torque tube, each saddle containing a pair of spaced bolt holes.

5. The apparatus of claim 4 wherein said fastening devices are bolts and locking fasteners.

6. The apparatus of claim 2 wherein the free ends of said pivot arms comprise a pair of spaced flange members including upper and lower flange members separated by a pair of spaced web members and wherein each flange member is provided with a pair of in-line slots along and between the web members which align with each other to facilitate the passage and alignment of a fastening device therethrough.

7. The apparatus of claim 6 wherein said fastening devices are bolts and locking fasteners.

8. The apparatus of claim 4 wherein the free ends of said pivot arms comprise a pair of spaced flange members including upper and lower flange members separated by a pair of spaced web members and wherein each flange member is provided with a pair of in-line slots along and between the web members which align with each other to facilitate the passage and alignment of a fastening device therethrough and wherein said plate members are fixed to said lower flange members.

9. The apparatus of claim 8 wherein said fastening devices are bolts and locking fasteners and further comprising a top plate covering the slots in said top flange, and provided with spaced holes located to accommodate said bolts.

10. The method of assembling a tag axle having spaced pivot arms with free ends carrying torque tube in a swing-frame auxiliary axle system that includes the steps of:

(a) locating and fixing an arm alignment device along the free end of each of said pivot arms;

(b) locating and fixing a pair of spaced torque tube alignment devices to said torque tube;

(c) providing aligning fastening openings in said arm alignment devices and said torque tube alignment devices; and (d) fastening said arm alignment devices to said torque tube alignment by inserting removable fastening devices through said fastening openings.

11. The method of claim 10 wherein said pivot arms include spaced flange members and comprising the further step of providing slots in said flange members to facilitate alignment of fastening devices.

* * * * *